F. A. BURROWS.
DEVICE FOR STARTING MOTOR CYCLES.
APPLICATION FILED OCT. 7, 1911.
1,021,657.
Patented Mar. 26, 1912.
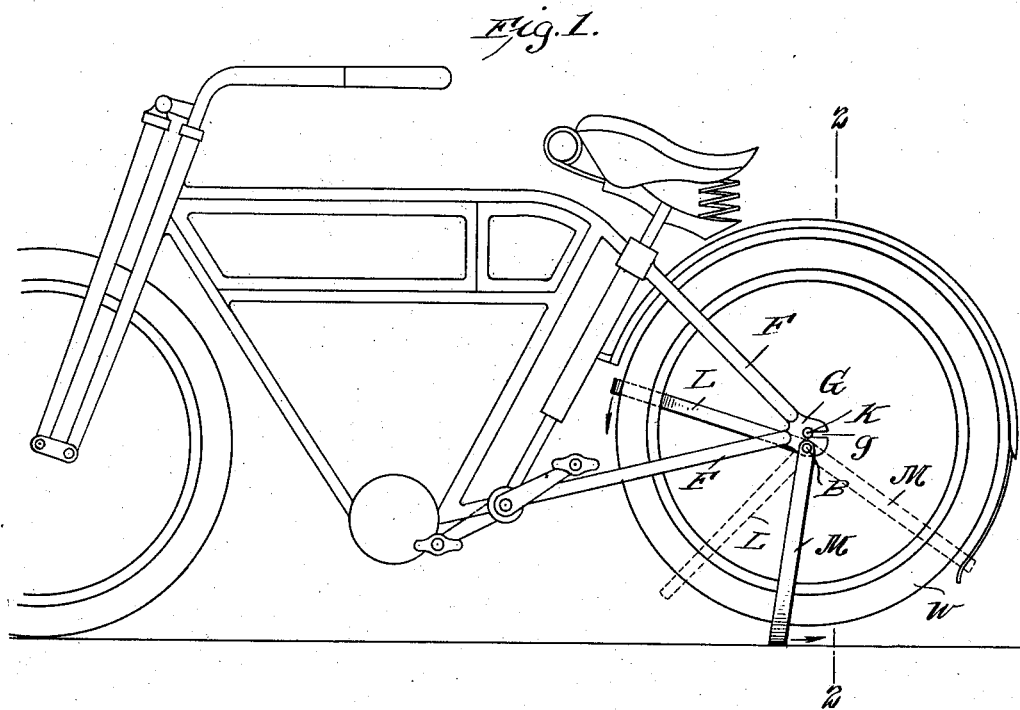
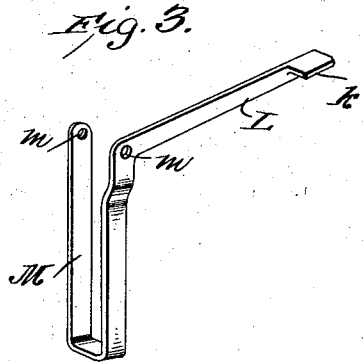
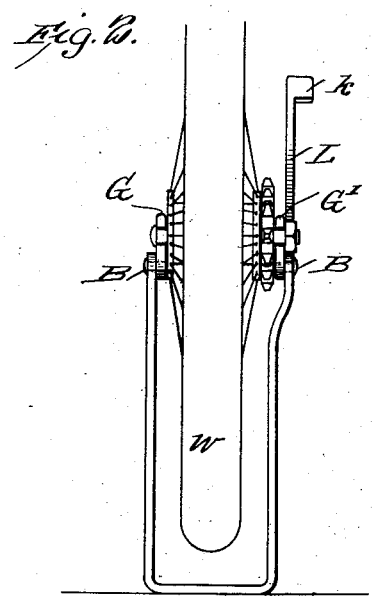
WITNESSES
INVENTOR
FRANCIS A. BURROWS
BY
ATTORNEYS

UNITED STATES PATENT OFFICE.

FRANCIS A. BURROWS, OF COLUMBIA, SOUTH CAROLINA.

DEVICE FOR STARTING MOTOR-CYCLES.

1,021,657.      Specification of Letters Patent.     Patented Mar. 26, 1912.

Application filed October 7, 1911. Serial No. 653,298.

*To all whom it may concern:*

Be it known that I, FRANCIS A. BURROWS, a citizen of the United States, and a resident of Columbia, in the county of Richland and State of South Carolina, have made certain new and useful Improvements in Devices for Starting Motor-Cycles, of which the following is a specification.

My invention relates to improvements in devices for starting motorcycles, and it consists in the combinations, constructions and arrangements herein described and claimed.

An object of my invention is to provide a simple device by means of which the rear wheel of a motorcycle may be lifted from the ground while the vehicle is at rest, and which is provided with a lever which may be pressed downwardly thereby bringing the rear wheel into contact with the ground and at the same time giving the vehicle a forward impetus.

Another object of my invention is to provide a device for accomplishing the first named object, which is simple in its nature, consisting practically of an integral piece which can be manufactured cheaply, is strong and durable, but which amply fulfils the purpose for which it is designed.

Other objects and advantages will appear in the following specification, and the novel features of the invention will be particularly pointed out in the appended claim.

My invention is illustrated in the accompanying drawings, in which,

Figure 1 is a side view of a motorcycle provided with my starting device, Fig. 2 is a rear view of a portion of the rear wheel showing the latter lifted from the ground, and Fig. 3 is a perspective view of the starting device proper.

In Fig. 1, F and F' represent the frame members on one side of the rear wheel. These frame members are joined together by the integral plate G which is provided with the usual slot $g$, for receiving the axle K of the rear wheel W. A similar integral plate G' is provided on the opposite side of the wheel, the wheel being held between these two plates in the usual manner.

Suspended from the plates G and G' is a U-shaped member M provided with openings $m$ at its upper end for the reception of bolts B, which enter the plates G and G' respectively. The arm of the U-shaped member M on one side of the wheel is provided with a laterally extending integral lever-arm L having a foot plate $k$, at its extremity. This lever-arm is inclined upwardly when the U-shaped member M is resting on the ground.

From the foregoing description of the various parts of the device the operation thereof may be readily understood.

Figs. 1 and 2 show the normal position of the device when the vehicle is at rest. In Fig. 1 it will be seen that the U-shaped member M forms a support or stand which lifts the rear wheel W from the ground, this support inclining slightly to the rear, from the ground to its pivotal connection.

In starting the device, the rider takes his seat, and by pedaling, starts up the engine, thus causing the rotation of the rear wheel. Now by pressing downwardly on the lever L he causes the support M to take the position shown in dotted lines in Fig. 1. The effect is to force the vehicle forward with an impulse in the direction of travel. At the same time the rear wheel is brought to the ground and the lever L takes the lower dotted line position shown in Fig. 1.

It will thus be seen that the vehicle may be started without pedaling the wheel along the road. It may be even started on an up grade without the necessity of dismounting. After the machine is in motion, the lever and the support retain the positions shown in dotted lines, where they are out of the way, thereby permitting the free progress of the vehicle.

The device is very simple and may be manufactured cheaply, and may be made strong enough to withstand severe usage. It is easily applied and as easily removed.

I claim:—

In a device for starting motorcycles, a U-shaped standard pivotally secured to the frame of the machine below the axle of the rear wheel, an integral lever-arm extending forwardly from the upper end of said U-shaped standard, on one side thereof, and provided with a foot-plate at its end arranged to be engaged by the foot of the rider, said standard serving to lift the rear wheel from the ground, and the depression of the foot-lever serving to elevate the standard and to give a forward movement to the machine.

FRANCIS A. BURROWS.

Witnesses:
W. PLATT,
GEO. BRONIS.

Copies of this patent may be obtained for five cents each, by addressing the "Commissioner of Patents, Washington, D. C."